W. STRAIT.
POWER TRANSMISSION MECHANISM FOR TRACTION MACHINES.
APPLICATION FILED MAY 24, 1913.

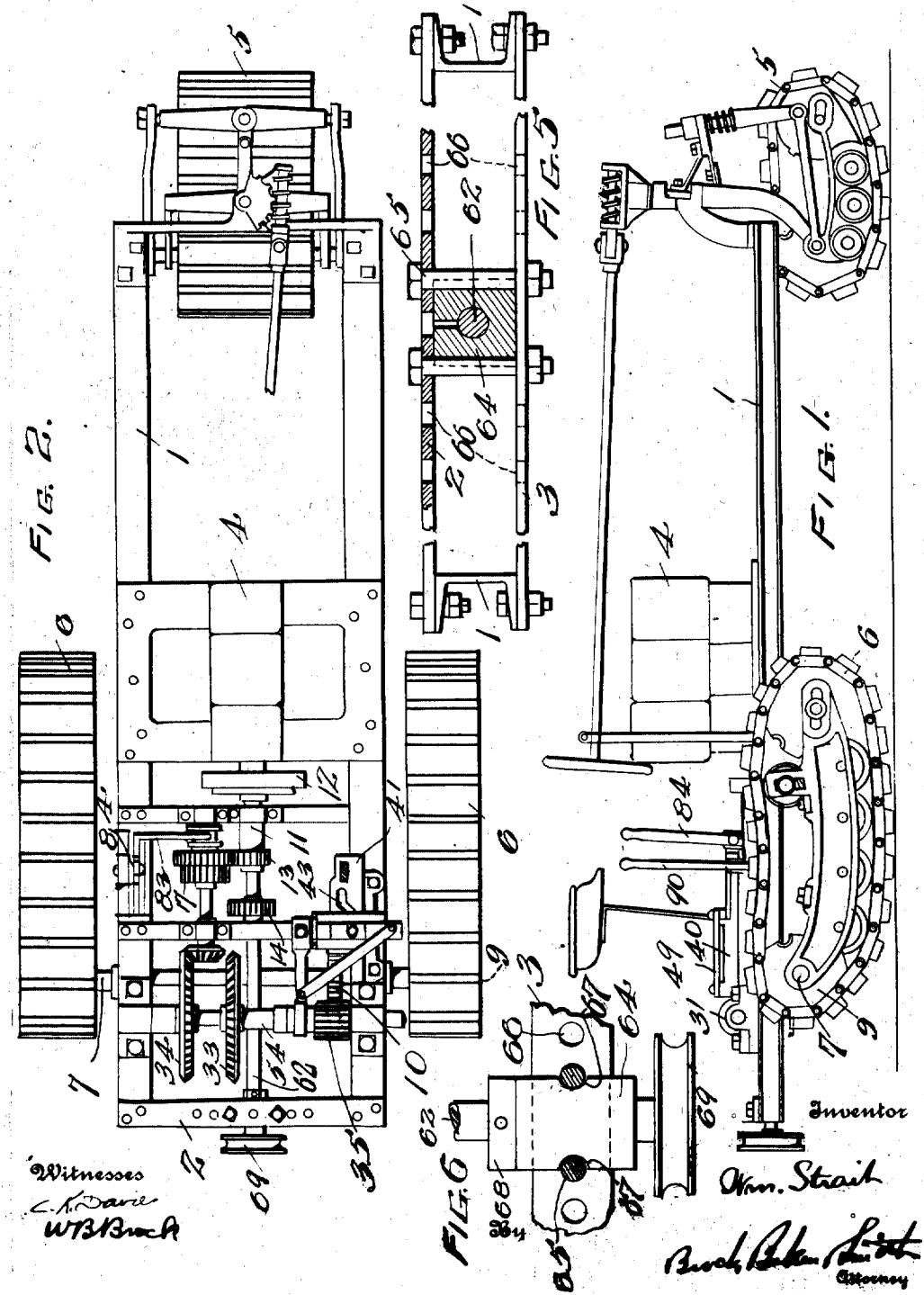

1,250,381.

Patented Dec. 18, 1917.
2 SHEETS—SHEET 2.

Witnesses
C. K. Davies
W. B. Buck

Inventor
William Strait
By Burch Bales Smith
Attorney

UNITED STATES PATENT OFFICE.

WILLIAM STRAIT, OF APPLETON, WISCONSIN.

POWER-TRANSMISSION MECHANISM FOR TRACTION-MACHINES.

1,250,381.  Specification of Letters Patent.  Patented Dec. 18, 1917.

Application filed May 24, 1913. Serial No. 769,621.

*To all whom it may concern:*

Be it known that I, WILLIAM STRAIT, a citizen of the United States, residing at Appleton, Wisconsin, have invented certain new and useful Improvements in Power-Transmission Mechanism for Traction-Machines, of which the following is a specification.

My invention relates to driving and change speed gearing, particularly adapted for tractors, and including provision for driving machinery by means of the tractor engine when the tractor is stationary. In a preferred form of the invention, the mechanism includes a removable power shaft to drive such machinery, with necessary arrangements for putting this shaft in position when desired.

The characteristics and advantages of the invention will be further described hereafter, in connection with a detailed description of the accompanying drawing, which shows one exemplifying embodiment of the invention.

Figure 1 is a side elevation.

Fig. 2 is a plan of a tractor embodying my invention.

Fig. 5 is a rear view, partly in section and partly in elevation, of the frame and removable shaft bearing.

Fig. 6 is an enlarged detail of the frame and removable bearing.

Figure 3:
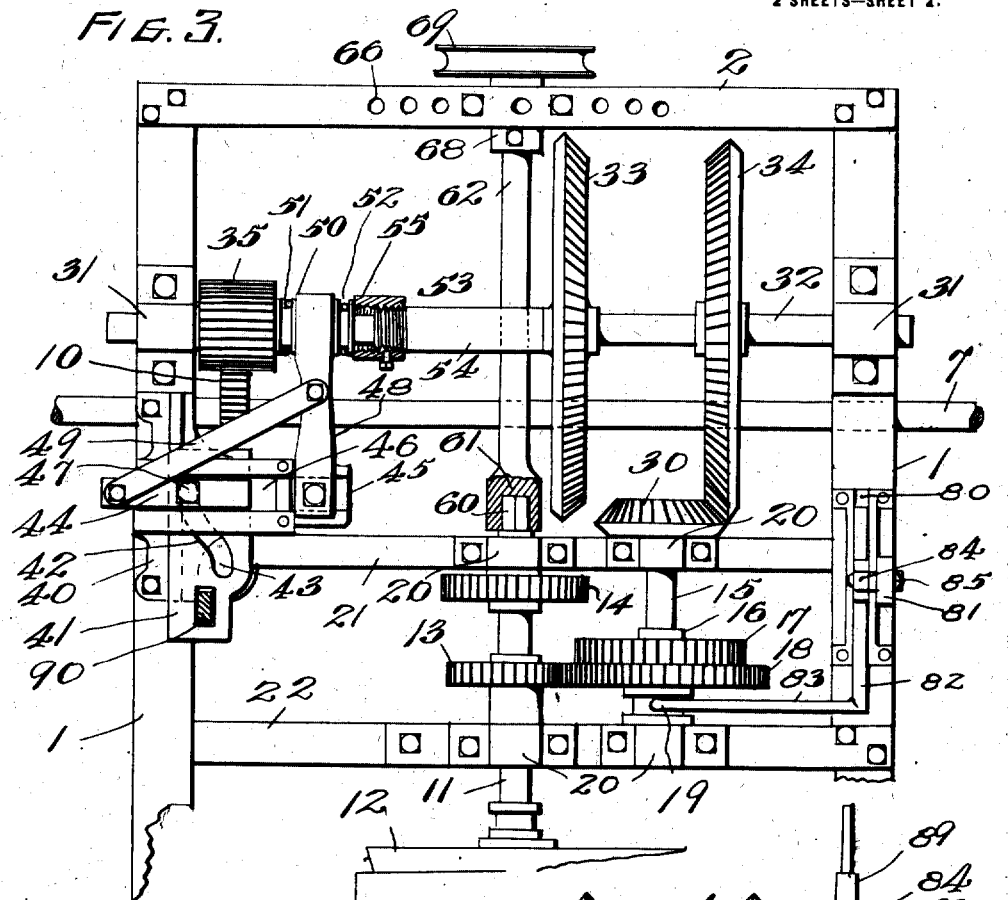
Fig. 3 is an enlarged plan view of the transmission mechanism.
Figure 4:
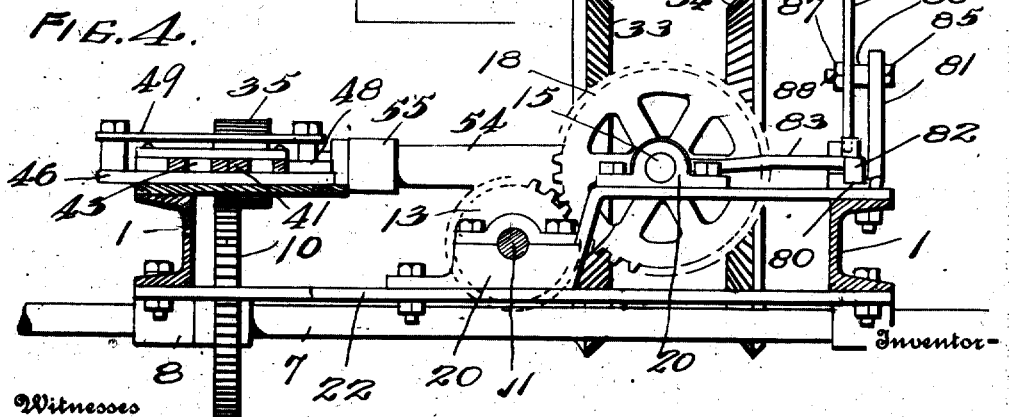
Fig. 4 is a front elevation of the mechanism shown in Fig. 3.

Reference character 1 designates side members of a tractor frame, connected at the rear by top and bottom cross-bars 2, 3, respectively. Suitably located on the frame is an engine 4. At the front is a steering tractor 5, and at the rear on each side is a driving tractor 6. Drive shaft 7, mounted in suitable bearings 8, carried by frame members 1, carries the drive sprockets 9 of the driving tractors. Driving shaft 7 is, of course, provided with differential mechanism for differentially driving the tractors in turning, but this differential mechanism may vary greatly and is, therefore, not particularly shown or described. Gear 10 is mounted on shaft 7 for driving the same.

In line with the main shaft of engine 4 is a primary gear shaft 11, which is connected and disconnected with the engine by clutch 12. On the primary shaft are spur gears 13, 14, of different diameters. At one side of the primary shaft 11 is countershaft 15, carrying the sliding gear element 16, consisting of gears 17, 18, and annular shaft collar 19. Shaft 15 is either splined or squared. Shafts 11 and 15 are rotatably mounted in bearings 20 carried by transverse frame members 21, 22. Frame member 22 is bolted to the lower sides of side members 1 and its bearings 20 are thus easily arranged so that the axis of shaft 11 is directly in line with the center of the opening between rear cross frame members 2 and 3, as clearly shown in Fig. 5. Transverse frame member 21 is bolted to the tops of side members 1 and shaft 15 is thus carried somewhat above the level of shaft 11.

At the rear end, shaft 15 is provided with a bevel pinion 30. Transversely mounted in the frame, in bearings 31, is bevel gear shaft 32, carrying forward and reverse driving beveled gears 33, 34, respectively. Bearings 31, rest upon side frame members 1, and thus shaft 32 is supported in the same plane as shaft 15. Gears 33 and 34 are rigidly geared to shaft 32 and the shaft is movable endwise in its bearings to engage either of the bevel gears with pinion 30, as may be desired. To permit such movement of shaft 32 and at the same time to transmit power from it to the drive shaft 7, shaft 32 has rigidly fixed on it wide faced pinion 35, engaging gear 10, previously mentioned.

Shaft 32 is shifted by the following means: On one of the side frame members 1 is bolted a plate 40. On this plate is slidably mounted in a longitudinal guideway, cam plate 41, having diagonal cam slot 42 with straight end portions 43, 44. Below this is mounted a bar 46 on which is an upwardly projecting stud 47, within the cam slot 42. At the inner end of bar 46 is rigidly bolted a shifter arm 48, and this is further strengthened and braced by a brace rod 49 bolted to arm 48 near shaft 32, and to bar 46 at its outer end. By reason of the fact that plate 40 and its guideways are made very heavy and rigid, and the fact that the shifter bar 46 is of ample length, and the construction of said bar and arm 48, and their brace rod 49, is very strong and rigid, the outer end of shifter arm 48 is positively and firmly held in whatever position it is placed in, by cam 42. The outer end of shifter arm 48 is made circular to embrace shaft 32, and, if desired, the end of said arm may be provided with a removable, bolted-on cap 50, as shown. Between the arm 48 and pinion 35 is placed a ball-thrust bearing 51, and at the other side of said arm is a ball-thrust bearing 52. A distance member 53 extends from the thrust bearing 52, to the hub of gear 33. Now, evidently, when cam plate 41 is in the position shown, stud 47 positively locates shifter arm 48 in such position, as shown, that reverse bevel gear 34 is in engagement with pinion 30. But when cam plate 41 is moved rearward, stud 47 is moved to the right, as seen in the drawing, and finally locked in this position by straight part 43 of the cam slot, and then forward driving bevel gear 33 is locked in engagement with pinion 30. To insure the proper positioning of shaft 32 and its gear, and especially forward driving gear 33, in relation to the shifter arm, the distance member 53 is preferably made adjustable. For this purpose the said distance member consists of a tube 54 resting against hub of gear 33 and threaded at the other end. A tubular collar 55, internally threaded, engages tube 54 and rests against the thrust bearing 52. By turning collar 55 in relation to tube 54, the distance of gear 33 from shifter 48 can be regulated in an obvious way, and the very accurate meshing of gear 33 with pinion 30 effected.

It has been explained that the axis of primary gear shaft 11 is in substantially the horizontal center plane of the frame and this axis passes below transverse shaft 32. Taking advantage of this arrangement, I provide shaft 11 with a squared rear end 60 to receive the squared socket 61 on the end of removable power shaft 62, shown in working position in all of the figures. At its rear end, this shaft is carried in a bearing 64, and this bearing is removably secured between transverse rear frame members 2 and 3, by bolts 65 passing through holes 66 in said frame members. To receive the bolts the bearing 64 is provided at each side with a half cylindrical vertical channel 67. Shaft 62 may also be provided with a thrust collar 68 just forward of the bearing, and at the rear of the bearing and outside the frame, the shaft may be provided with any suitable gear pulley or other driving element 69 by which power may be conveyed to any machine or implement.

As shown in Fig. 3, the rear frame members 2, 3, are provided with a multiplicity of holes 66, these being in vertical line in the two frame members, so that plows, harvesters, wagons, or any other loads may be easily and properly attached to the tractor for hauling. This same arrangement is made use of as just described, to provide easy means of securing the removable power shaft in position by utilizing two pairs of holes 66 and two bolts 65, which may be the same as are used for coupling pins.

A plurality of removable power shafts 62 may be provided, each having a different kind of gear pulley, or other transmission device, so that the tractor may be used to drive various kinds of farm machinery without any more work or trouble than inserting the proper power shaft, or changing from one to the other, as the work may require.

When the tractor is to be used for hauling, the power shaft 62 is removed. The operation of the change speed mechanism for driving at different gear ratios is obvious from the foregoing description of the tractor. When the tractor is to be used for stationary power purposes, the drive shaft 7 may be disconnected while the engine is driving power shaft 62, either by placing shaft 32 in neutral position, or placing the sliding gear element 16 in position midway between gears 13 and 14.

It should be especially noticed that while, when the removable power shaft 62 when in use is in the most advantageous position—the center line of the machine, it may be removed completely if desired, so that the draw-bars 2, 3, are entirely unobstructed and so that a load of any kind may be hitched to the center of said bars, which is the most advantageous way of hitching most loads, in view of the fact that when so hitched the draft on the tractor is evenly balanced.

To shift the sliding gear element 16, the adjacent frame member 1 is provided with a guide channel 80 and fulcrum post 81. In the channel is a shifter bar 82 connected to the gear element by arm 83 and yoke engaging annular groove 19 of the gear element. Lever 84 is pivoted to the fulcrum post at 85, and to provide simple and efficient means for holding the shifting means in proper position, this pivot point is preferably provided with friction devices. A preferred form of such retaining devices consists in a leather or other frictional disk 86 between the lever and the post, and a spring washer 87 adjustably compressed between the lever and the bolt head 88. The bolt 88, of course, passes through the fulcrum post, lever and friction disk and washer.

The upper end of the lever adjacent to the handle may also be provided with a weight 89. When the lever is thrown either way to shift the gear, the weight 89 and friction fulcrum will effectively hold the sliding element in proper position.

A suitable lever 90 is also provided for moving cam plate 41.

I claim:—

1. In a traction machine, the combination of a main frame, driving tractors, a drive shaft therefor, a motor, change speed gearing intermediate said motor and said drive shaft, a removable power shaft, and means for securing said power shaft detachably to a permanent member of said main frame and in engagement with an element of said gearing so that the detachable shaft is entirely supported by the vehicle.

2. In a traction machine, the combination with a main frame, driving tractors, a drive shaft therefor, a motor, change speed gearing intermediate said motor and drive shaft, a removable power shaft, means for connecting said power shaft with an element of said change speed gearing, a bearing for said power shaft, and means for detachably securing said bearing in position on a permanent part of the frame, so that the detachable shaft is entirely supported by parts of the traction machine.

3. In a traction machine, the combination of a main frame, driving tractors, a motor, transmission mechanism intermediate said motor and tractors, means for operatively connecting and disconnecting the motor and tractors through said transmission mechanism, a power shaft having means for detachably connecting it to a part of said transmission mechanism, a bearing for said power shaft, and means for detachably securing said bearing to a fixed part of the frame.

4. In a traction machine, the combination of a frame having a fixed transverse rear member provided with means for connecting a load thereto, a motor, driving tractors, transmission mechanism intermediate said motor and tractors, including connecting and disconnecting means, a power shaft provided with means for detachably connecting it with a part of said transmission mechanism, a bearing for said shaft, and means for connecting said bearing detachably to said rear transverse frame member.

5. In a tractor, the combination of a main frame, an engine, a driving shaft and transmission gearing to connect the engine with said shaft, said gearing including a member adapted for engagement by a dismountable power shaft, transverse rear members on the main frame having coupling holes for the attachment of a load to be drawn by the tractor, a removable bearing and removable bolts to coöperate with said bearing and said coupling holes to detachably secure the bearing to said frame members, and a detachable power shaft supported in said bearing and having a part to be engaged with with said gear member.

WILLIAM STRAIT.

Witnesses:
A. M. PARKINS,
D. M. SMITH.